US009140957B2

(12) United States Patent
Velthaus

(10) Patent No.: US 9,140,957 B2
(45) Date of Patent: Sep. 22, 2015

(54) MACH-ZEHNDER MODULATOR ARRANGEMENT AND METHOD FOR OPERATING A MACH-ZEHNDER MODULATOR ARRANGEMENT

(71) Applicant: FRAUNHOFER-GESELLSCHAFT ZUR FÖRDERUNG DER ANGEWANDTEN FORSCHUNG E.V., München (DE)

(72) Inventor: Karl-Otto Velthaus, Kleinmachnow (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 14/371,978

(22) PCT Filed: Jan. 10, 2013

(86) PCT No.: PCT/EP2013/050405
§ 371 (c)(1),
(2) Date: Jul. 11, 2014

(87) PCT Pub. No.: WO2013/104716
PCT Pub. Date: Jul. 18, 2013

(65) Prior Publication Data
US 2014/0355926 A1   Dec. 4, 2014

(30) Foreign Application Priority Data

Jan. 12, 2012   (EP) .................................... 12150995

(51) Int. Cl.
*G02F 1/035*  (2006.01)
*G02F 1/225*  (2006.01)
(Continued)

(52) U.S. Cl.
CPC ............ *G02F 1/2257* (2013.01); *G02F 1/0121* (2013.01); *G02F 1/225* (2013.01); *G02F 1/2255* (2013.01); *G02F 1/25* (2013.01); *G02F 2001/212* (2013.01); *G02F 2201/126* (2013.01)

(58) Field of Classification Search
CPC ... G02F 1/225; G02F 1/011; G02F 2001/212; G02F 1/2257; G02F 2201/12; G02B 2006/12142; G02B 6/2935
USPC ....................................... 385/3, 8, 30–31, 45
See application file for complete search history.

(56) References Cited

U.S. PATENT DOCUMENTS 7,340,114 B2 *  3/2008  Doi et al. ......................... 385/2
8,705,900 B2 *  4/2014  Goh et al. ........................ 385/3
(Continued)

FOREIGN PATENT DOCUMENTS

GB           2 407 644 A     5/2005
WO         03/062914 A1     7/2003

OTHER PUBLICATIONS

H.N. Klein, H. Chen, D. Hoffmann, S. Staroske, A.G. Steffan, K.-O. Velthaus, 1.55 µm Mach-Zehnder modulators on InP for optical 40/80 Gbit/s transmission networks, in International Conference on Indium Phosphide and Related Materials Conference Proceedings, 2006, pp. 171-173.
(Continued)

*Primary Examiner* — Ellen Kim
(74) *Attorney, Agent, or Firm* — Maschoff Brennan

(57) ABSTRACT

An electro-optic Mach-Zehnder modulator arrangement includes first and second optical waveguides forming, respectively, first and second arms of the Mach-Zehnder modulator. An electrode arrangement includes a first waveguide electrode output port coupled to the first waveguide electrodes a second waveguide electrode arranged on top of a capacitive segment of the first and the second optical waveguides, respectively, such that a voltage can be applied across the capacitive segments of the first and second optical waveguide. At least one driver unit supplies a voltage to the electrode arrangement. The driver unit includes first and second output ports coupled, respectively, to the first and second waveguide electrodes. The driver unit supplies first and second varying signals to the first and second waveguide electrodes via the first and second output ports, respectively. A non-grounded conductive region connects the capacitive segments of the first and second optical waveguides to each other.

11 Claims, 10 Drawing Sheets

(51) Int. Cl.
*G02F 1/25* (2006.01)
*G02F 1/01* (2006.01)
*G02F 1/21* (2006.01)

(56) References Cited

U.S. PATENT DOCUMENTS 8,855,448 B2 * 10/2014 Doerr ............................ 385/3
2010/0150494 A1 6/2010 Prosyk et al.

OTHER PUBLICATIONS

T. Yamase et al., "10-Gb/s in-line centipede electrode InP MZM and low-power CMOS driver with quasi-traveling wave generation" OptoeElectronics and Communications Conference (OECC), 2011 16th, Jul. 4-8, 2011.

D. Hoffman et al., "45 GHz bandwidth travelling wave electrode Mach-Zehnder modulator with integrated spot size converter" Indium Phosphide and Related Materials, 2004. 16th IPRM. 2004 International Conference on, May 31 to Jun. 4, 2004.

H. Yasaka et al., "Advances in InP Mach-Zehnder modulators for large capacity photonic network systems" Indium Phosphide and Related Materials, 2008. IPRM 2008. 20th International Conference on, May 25-29, 2008.

Y. Ehrlichman et al., "Direct digital drive optical QAM modulator with a single Multi-Electrode Mach Zehnder Modulator" Optical Communication (ECOC), 2010 36th European Conference and Exhibition on, Sep. 19-23, 2010.

J. Godin et al., "InP DHBT Very High Speed Power-DACs for Spectrally Efficient Optical Transmission Systems" Compound Semiconductor Integrated Circuit Symposium (CSICS), 2011 IEEE, Oct. 16-19, 2011.

T. Kato et al., "10-Gb/s-80-km operation of full C-band InP MZ modulator with linear-accelerator-type tiny in-line centipede electrode structure directly driven by logic IC of 90-nm CMOS process" Optical Fiber Communication Conference and Exposition (OFC/NFOEC), 2011 and the National Fiber Optic Engineers Conference, Mar. 6-10, 2011.

* cited by examiner

MACH-ZEHNDER MODULATOR ARRANGEMENT AND METHOD FOR OPERATING A MACH-ZEHNDER MODULATOR ARRANGEMENT

CROSS-REFERENCE TO A RELATED APPLICATION

This application is a National Phase Patent Application of International Patent Application Number PCT/EP2013/050405, filed on Jan. 10, 2013, which claims priority of European Patent Application Number 12150995.4, filed on Jan. 12, 2012.

BACKGROUND

The invention relates to an electro-optic Mach-Zehnder modulator arrangement and to a method for operating a Mach-Zehnder modulator arrangement.

It is known in the art to use Mach-Zehnder interferometers as electro-optic modulators in optical high-speed transmission systems, wherein, for example, separate (electrically uncoupled) continuous electrodes disposed on the optical waveguides of the modulator are employed for applying a voltage across the optical waveguides. Such a modulator is disclosed, for example, in the publication "Advances in InP Mach-Zehnder modulators for large capacity photonic network systems", H. Yasaka et al., Indium Phosphide and Related Materials, IPRM 2008, p. 1. A high frequency (e.g. >20 GHz) voltage is supplied to the electrodes by two 50 Ohm drivers amplifying a high frequency input signal. The optical waveguides comprise capacitive segments in the form of integrated diodes, wherein a DC bias is applied to the electrodes in order to bias the diodes in reverse direction. In order to prevent the DC voltage from entering the drivers, a DC blocking capacitance or a bias-T has to be arranged between the output ports of the drivers and the electrodes of the modulator. The DC blocking capacitance or the bias-T, however, may deteriorate the high frequency properties of the modulator and incurs additional costs.

Further, the publication "10 Gb/s-80-km operation of full C-band InP MZ modulator with linear-accelerator-type tiny in-line centipede electrode structure directly driven by logic IC of 90-nm CMOS process", T. Kato et al., Optical Fiber Communication Conference and Exposition, 2011, p. 1, discloses a Mach-Zehnder modulator comprising a plurality of waveguide electrodes arranged on the optical waveguides of the modulator, wherein multiple drivers are used to individually drive the waveguide electrodes.

SUMMARY

It is an object of the invention to provide a Mach-Zehnder modulator arrangement that has good high frequency properties and that can be fabricated in a cost effective way.

According to an exemplary embodiment of the invention, an electro-optic Mach-Zehnder modulator arrangement is provided, comprising
   a first optical waveguide forming a first arm of the Mach-Zehnder modulator;
   a second optical waveguide forming a second arm of the Mach-Zehnder modulator;
   an electrode arrangement comprising at least one first waveguide electrode and at least one second waveguide electrode arranged on top of a capacitive segment of the first and the second optical waveguide, respectively, such that a voltage can be applied across the capacitive segments of first and second optical waveguide;
   at least one driver unit for supplying a (e.g. alternating) voltage to the electrode arrangement, the driver unit comprising at least a first output port coupled to the first waveguide electrodes and a second output port coupled to the second waveguide electrodes, wherein
   the driver unit is configured to supply a first varying signal to the first waveguide electrodes via the first output port and to supply a second varying signal to the second waveguide electrodes via the second output port; and
   a non-grounded conductive region via which the capacitive segment of the first optical waveguide is connected to the capacitive segment of the second optical waveguide such that the first and second waveguide electrodes are capacitively coupled to one another.

For example, a non-grounded (at least not permanently grounded) signal-carrying connector of the first output port is connected to the first waveguide electrode and a non-grounded signal-carrying connector of the second output port is connected to the second waveguide electrode.

The capacitive segments of the optical waveguides are e.g. formed by diodes integrated in the optical waveguides, wherein a DC voltage may be applied to bias the diodes in reverse direction. As a varying signal (a varying voltage) is supplied to both the first and the second waveguide electrode and since the first and the second waveguide electrode are capacitively coupled via the capacitive segments and the non-grounded conductive region, the capacitive segments (e.g. the reversely biased diodes) of the optical waveguides inherently block a DC voltage supplied to the capacitive segments such that the DC voltage is decoupled from the driver unit. Therefore, a separate DC blocking capacitor or a bias-T between the driver unit and the first and the second waveguide electrode for preventing the DC voltage from arriving at the driver unit is not necessary.

The DC voltage for biasing the diodes of the capacitive segments may be supplied by a DC-source of the Mach-Zehnder modulator arrangement, wherein the DC-source may be connected to the first and/or the second waveguide electrodes and the conductive region. The DC-source may also be connected to the mass of the driving unit and the conductive region. According to another example of the invention, the DC-source is connected to the first and/or the second waveguide electrodes via a connecting point located between two terminating resistors coupled between the first and the second waveguide electrode. This has the effect that a photo current created in the region of the capacitive segments will symmetrically flow across the terminating resistors such that the DC voltage across the terminating resistors will be the same, thereby eliminating a contribution of a chirp of the optical signal generated by the Mach-Zehnder modulator.

It is noted that if a plurality of waveguide electrodes is arranged on the first and/or the second optical waveguide (see below), the optical waveguides comprise a corresponding number of capacitive segments.

According to an exemplary embodiment of the invention, the conductive region is arranged on a side of the capacitive segments that faces away from the waveguide electrodes. For example, the Mach-Zehnder modulator is formed as a semiconductor device and the conductive region is formed by an n-doped semiconductor layer. For example, the conductive region is formed by a portion of the n-doped semiconductor layer that is at least partially surrounded (limited) by an isolation groove extending through the n-doped layer. Thus, the conductive region is electrically isolated from the remaining n-doped layer. It is noted that the conductive region does not necessarily have to be formed by an n-doped layer. Rather, the conductive region may be formed by any conductive material region (e.g. a metal region) electrically isolated from its surroundings.

The waveguide electrodes may be operated similar to electrical lines used for differential signaling. For example, the first waveguide electrode and the second waveguide electrode may be driven symmetrically, i.e. the absolute value of the first signal (e.g. a first RF voltage) supplied to the first waveguide electrode is identical to the absolute value of the second signal (e.g. a second RF voltage) supplied to the second waveguide electrode. For example, the driver unit is a differential driver unit such that the first and the second signal have opposite polarity but may have the same absolute value (bipolar operation).

Supplying a varying signal (voltage) to both waveguide electrodes may have the advantage over the conventional asymmetric electrode operation (having grounded first or second waveguide electrodes) that stray capacitance against ground (mass) can be avoided or reduced such that a complicated grounding layout is not necessary. The Mach-Zehnder modulator arrangement according to the invention, for example, permits the driver unit and/or the Mach-Zehnder modulator to comprise a grounded (e.g. metal) carrier, i.e. circuitry of the driver unit (implementing, for example, the first and the second output port) may be arranged on a grounded (e.g. metal) carrier. Also, the semiconductor substrate used for arranging the optical and electrical Mach-Zehnder modulator structures (such as the optical waveguides) may still be be arranged on an insulating carrier.

Using a differential driver unit only half of the required driving voltage $V_\pi$ is to be supplied to the first and the second waveguide electrode(s), respectively. Thus, in contrast to the conventional single drive operation, the driver unit does not have to be configured to be able to deliver the full required driving voltage. For example, the on-off-keying format requires a driving voltage $V_\pi$ of about 2-2.5 V, wherein a phase modulation format even requires a driving voltage of $2 \times V_\pi$, i.e. about 4-5 V. Such voltages often require multi-stage drivers. Using the modulator arrangement according to the invention, a driving voltage of only $+V_\pi/2$ is supplied to the first waveguide electrode(s) and a driving voltage of $-V_\pi/2$ is supplied to the second waveguide electrode(s) (or the other way round, $-V_\pi/2$ to the first waveguide electrode(s) and $+V_\pi/2$ to the second waveguide electrode(s)).

It is noted that in some differential driver regimes the (e.g. RF) drive voltage is used in a switching mode—the output potential gets switched from one output to the other to drive either a logical "one" or a "zero" respectively. Regarding the absolute RF voltage swing there is no difference to already described approach with dual polarity. Thus, it is possible to supply a first signal (non-zero potential) to the first waveguide electrode(s) while the second electrode(s) are on ground (zero) potential during a first period of time and to supply a second, non zero signal (potential) to the second waveguide electrode(s) while the first waveguide electrode(s) are on ground potential during a second period of time. In other words, the first and second waveguide electrode(s) may be driven corresponding to the "low-voltage differential signaling"—LVDS—scheme.

A first driver unit stage (comprising the first output port) of the driver unit may be configured to deliver an output voltage of about 1-1.25 V and a second driver unit stage (comprising the second output port) to deliver an output voltage of also about 1-1.25 V. These low required output voltages, for example, permit the driving unit to be fabricated using SiGe substrates (using a BiCMOS process, for example) instead of GaAs substrates.

It is noted that the Mach-Zehnder modulator arrangement may comprise a plurality (for example, two) Mach-Zehnder modulators, wherein the signal-carrying first and second waveguide electrodes of the modulators may reduce crosstalk between adjacent modulators such that a higher "modulator density" may be realized. For example, an arrangement comprising multiple Mach-Zehnder modulators may be used for quadrature amplitude modulation systems. Also, the arrangement according to the invention may be used in photonic ICs (PICs), e.g. OFDM (Orthogonal frequency-division multiplexing) PICs.

Also, parasitic electrical modes may be reduced or even eliminated as both the first and the second waveguide electrodes are not grounded such that the grounding design does not have to be completely reconsidered when changing the module design.

According to an exemplary embodiment of the invention, the impedance of the driver unit at each one of the two output ports (i.e. the impedance of the first and second driver stage producing the voltage supplied to first and the second waveguide electrodes via the first and the second output port) is at least essentially half of the impedance of the travelling wave electrode arrangement.

For example, the impedance of the travelling wave electrode arrangement is in the range between approximately 46 to approximately 54 Ohm or is approximately 50 Ohm such that the impedance of the driver unit at the first output port is about 23 to 27 Ohm or about 25 Ohm and at the second output port also about 23 to 27 Ohm or about 25 Ohm. Of course, other impedances could be used, wherein the impedance at the driver output ports may be adapted to the impedance of the design of the travelling waveguide electrodes. The driver unit may further comprise an input port having an impedance of approximately 50 Ohm such that the input port can be connected to conventional 50 Ohm equipment.

It is further noted that a conventional differential (symmetrical) drive operation comprises a grounded contact between the two waveguide electrodes (for example, an electrode connected to a ground connector of the driver unit)), which is not necessarily required in the Mach-Zehnder modulator arrangement according to the invention.

According to an exemplary embodiment of the invention, the modulator is capacitively coupled, which means in particular that the waveguide electrodes with respect to an RF voltage applied to the electrodes are coupled via a conductive region (for example, an n-doped region) located between them (as explained in more detail below). Driving the waveguide electrodes symmetrically (for example, using a bipolar differential signal or a switched unipolar RF signal similar to the differential scheme used in the LVDS standard as set forth above) may have the effect that the potential relative to ground of the conductive region does not change during operation of the modulator. Thus, if a capacitance occurs between the conductive region and ground, this capacitance will not be loaded or unloaded by the RF voltage applied to the waveguide electrodes such that a stray capacitance between the conductive region and ground affecting the electro-optical characteristics of the modulator may be avoided. In the conventional, asymmetric electrode operation the conductive region between the waveguide electrodes has a "floating" potential, i.e. a potential that varies with the applied RF voltage. Subsequently, a capacitance occurring between the conductive region and ground may be loaded and unloaded during RF operation and thus may form a stray capacitance impairing the electro-optical performance of the modulator.

Thus, the conductive region may have a constant or nearly constant potential (which may be ground potential or nearly ground potential) because of the symmetric drive, but, for example, there is no connection (at least no direct connection) between the conductive region and the ground of the driver unit) such that the conductive region may be "non-grounded". It is noted, however, that a DC-source may be used to bias the conductive region (see below), wherein it may be possible to bias the conductive region in such a way that it assumes ground potential (by setting the DC voltage to zero). However, in intended operation of the Mach-Zehnder modulator arrangement the bias voltage will not be set to zero such that in intended operation the conductive region is "non-grounded". In particular, "non-grounded" means that the conductive region is not connected to ground via the driver unit, i.e. there is no electrical connecting means (such as a wire or another electrically conductive element) arranged between the conductive region and a ground contact (e.g. a ground connector) of the driver unit. Further, for example, the Mach-Zehnder-modulator and the driver unit form a unit, wherein there is no connection between the conductive region and the mass of this unit, i.e. there is no internal (within the unit formed by the Mach-Zehnder-modulator and the driver unit) connection (no "on-chip"-connection) of the conductive region to ground, although the conductive region may be set to ground potential using a DC-source, which, however, is located external to the unit formed by the modulator and the driver unit.

The impedance of the travelling wave electrode arrangement depends on the design of the electrodes such as the design of the waveguide electrodes (e.g. their length, number and the space between the waveguide electrodes) and the design of the coplanar lines connected to the waveguide electrodes.

Furthermore, the Mach-Zehnder modulator arrangement may comprise a plurality of first waveguide electrodes and a plurality of second waveguide electrodes. For example, the waveguide electrode are electrically isolated from one another and a plurality of driver units may be provided, wherein each one of the driver units is assigned to one first waveguide electrode and one second waveguide electrode. Thus, the waveguide electrodes can be driven individually (independent from one another) as described in the above mentioned publication "10 Gb/s-80-km operation of full C-band InP MZ modulator with linear-accelerator-type tiny in-line centipede electrode structure directly driven by logic IC of 90-nm CMOS process", T. Kato et al., Optical Fiber Communication Conference and Exposition, 2011, p. 1, which in respect to the multiple driver arrangement is incorporated by reference herewith. It is noted that the driving units may have amplifying capabilities.

It is, however, also possible that the Mach-Zehnder modulator arrangement comprises at least one digital-to-digital converter, at least one digital-to-analog converter and/or at least one field programmable gate array component, the digital-to-digital converter, the digital-to-analog converter or the field programmable gate array component being connected to at least one of the driver units or implementing at least one of the driver units (in order to provide and supply an input signal to the driver unit(s)). The digital-to-digital converter(s) and/or field programmable gate array component(s) may be used to individually drive the separated electrodes as described, for example, in the publication "Direct Digital Drive Optical QAM Modulator with a Single Multi-Electrode Mach Zehnder Modulator", Y. Ehrlichmann et al., Optical Communication (ECOC), 2010, p. 1, which in respect of the electrical layout of the modulator is incorporated by reference herewith. The digital-to-analog converter may be a "power DAC" as described in the article "InP DHBT Very High Speed Power-DACs for Spectrally Efficient Optical Transmission Systems", J. Godin, Compound Semiconductor Integrated Circuit Symposium (CSICS), 2011 IEEE.

The multiple programmable outputs of an FPGA (field programmable gate array) may be used to individually drive the separated electrodes to achieve programmable optical filters.

It is also possible that the Mach-Zehnder modulator arrangement according to the invention comprises a first and a second electrical line extending essentially parallel to the first and second optical waveguide, wherein the signal-carrying connector of the first output port and the signal-carrying connector of the second output port of the driver unit are coupled to the plurality of first and second waveguide electrodes via the first and second electrical line, respectively. For example, the first and the second electrical line are formed as coplanar microwave strip lines. In other words, the basic design of the Mach-Zehnder modulator is a coplanar stripline (CPS) travelling wave design, wherein, however, none of the coplanar lines is permanently grounded.

An example of a possible principal optical and electrical layout of a CPS travelling wave Mach-Zehnder modulator is described in the publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004, wherein the content of this article in respect to the optical and electrical design of the Mach-Zehnder modulator is incorporated by reference herewith. It is noted, however, that the invention is of course not restricted to a particular basic design of the Mach-Zehnder modulator. For example, the optical waveguides could also be formed as strongly guiding ("deep ridge") waveguides as disclosed in U.S. patent application Ser. No. 12/638,372 (published as US 2010/0150494 A1) and in the article "High performance InP-based Mach-Zehnder modulators for 10 to 100 Gb/s optical fiber transmission systems", K.-O. Velthaus et al., Compound Semiconductor Week and 23rd International Conference on Indium Phosphide and Related Materials, CSW/IPRM 2011, which are also incorporated by reference herewith.

According to another exemplary embodiment of the invention, the first and/or the second output port of the driver unit are, for example, connected to the first or second electrical line via an adapted RF connecting waveguide, e.g. a microstrip line (each of the RF connecting waveguides having an impedance of about half of the impedance of the TWE electrodes, e.g. about 25 Ohm). For example, the RF connecting waveguides are short lines (having a length of e.g. not more than 10 mm such that the driver unit is positioned in proximity of the travelling wave electrodes. In particular, the RF connecting waveguides may extend in the interior of a housing of the Mach-Zehnder-modulator arrangement (such that no 25 Ohm feedthroughs are required).

It is also possible that the driver unit (i.e. its first and second output port) are directly connected to the first and second electrical line of the modulator, i.e. without using an electrical (microstrip) line between the output ports and the electrical lines of the modulator, e.g. the connection is realized by a bonding material, only. The driver unit and the Mach-Zehnder-modulator may be arranged in a common housing but may be disposed, for example, on different substrates consisting of different materials (hybrid integration). However, the driver unit may also be arranged outside a modulator housing.

The invention also relates to a method for operating a Mach-Zehnder modulator arrangement comprising the steps of:

providing at least one electro-optic Mach-Zehnder modulator comprising a first optical waveguide forming a first modulator arm and a second optical waveguide forming a second modulator arm;

providing an electrode arrangement comprising at least one first waveguide electrode and at least one second waveguide electrode arranged on top of a capacitive segment of the first and the second optical waveguide, respectively, such that a voltage can be applied across the capacitive segments of first and second optical waveguide;

providing a non-grounded conductive region via which the capacitive segment of the first waveguide electrode is connected to the capacitive segment of the second waveguide electrode such that the first and second waveguide electrodes are capacitively coupled to one another; and supplying a first varying signal to the first waveguide electrodes and supplying a second varying signal to the second waveguide electrodes.

In particular, a differential driver unit is used for supplying a first voltage signal to the first waveguide electrodes and a second (inverse) voltage signal to the second waveguide electrodes as already set forth above.

BRIEF DESCRIPTION OF THE DRAWINGS

Embodiments of the invention will be described in more detail hereinafter with reference to the drawings.

DETAILED DESCRIPTION

Figure 1:
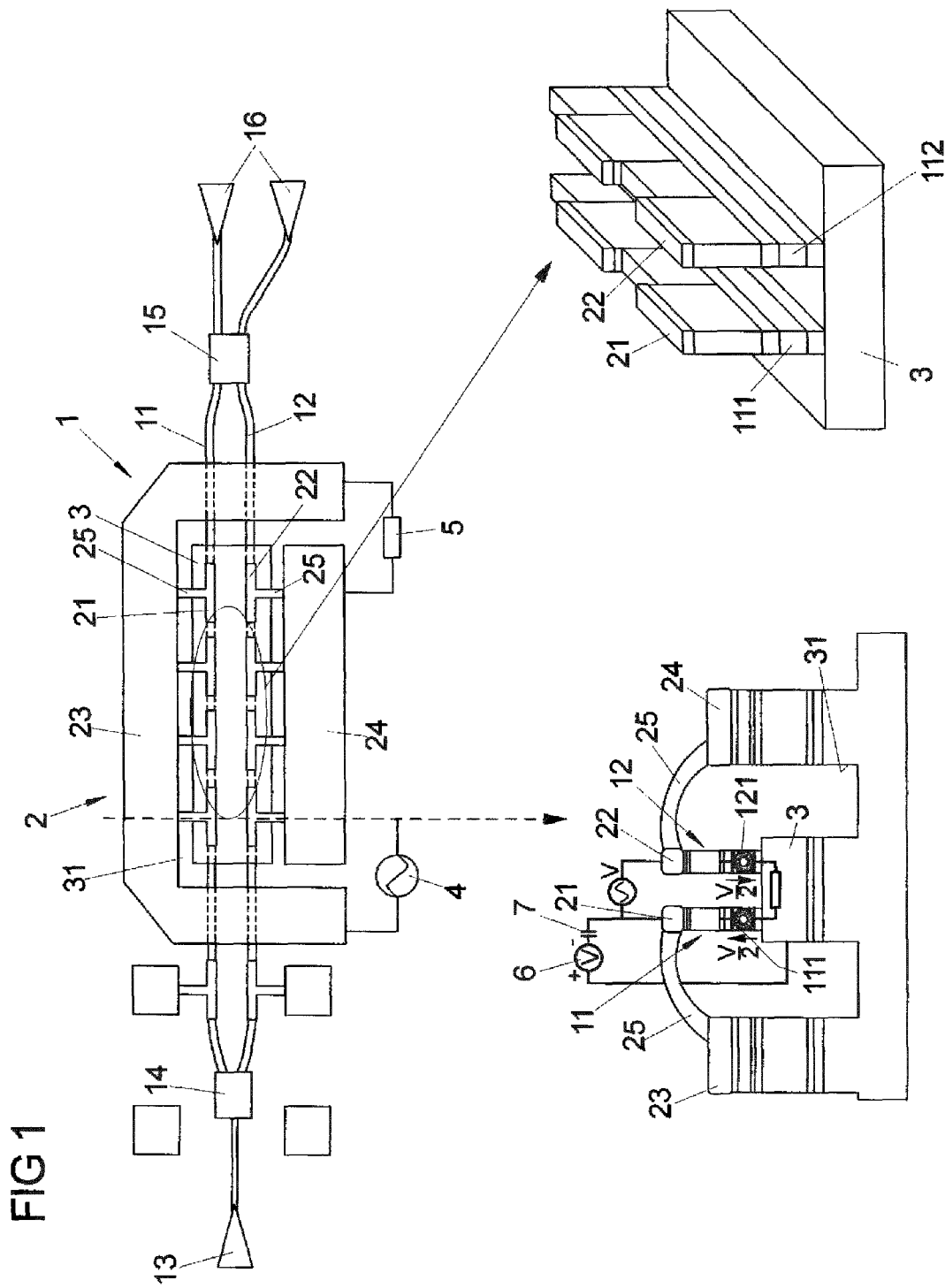
FIG. 1 illustrates the principal layout of a known Mach-Zehnder modulator.

FIG. 1 shows the principal layout of a prior art coplanar stripline travelling wave Mach-Zehnder modulator 1 as disclosed, for example, in the publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004, already mentioned above. The Mach-Zehnder modulator 1 comprises a first and a second optical waveguide 11, 12, wherein an optical input port of the modulator 1 comprises a spot size converter 13 and a splitter 14 that distributes the optical power inserted via the input port to the first and the second optical waveguide 11, 12.

At the output port side, the first and the second optical waveguide 11, 12 are merged in a combiner 15 (for example, realized by a multi mode interference—MMI device). The output port also comprises spot size converters 16 connected to output ports of the combiner 15.

Further, the Mach-Zehnder modulator 1 comprises a travelling wave electrode arrangement 2 that comprises a plurality of first waveguide electrodes 21 and a plurality of second waveguide electrodes 22 for applying a voltage V supplied by a high frequency voltage source 4 across the first and the second optical waveguide 11, 12. The first and second waveguide electrodes 21, 22 are arranged periodically (with a distance from one another) on top of the first and the second optical waveguide 11, 12, respectively. The travelling wave electrode arrangement 2 further comprises two coplanar microwave (e.g. microstrip) lines 23, 24 extending at least partially parallel to the first and the second optical waveguide 11, 12. The first and the second coplanar line 23, 24 are connected to the first and second waveguide electrodes 21, 22 via a plurality of air bridges 25. Thus, the first electrodes 21 are connected to one another via the first coplanar line 23 and the second electrodes 22 are connected to one another via the second coplanar line 24.

The first and second waveguide electrodes 21, 22 are arranged on first and second capacitive segments 111, 121 of the first and the second optical waveguide 11, 12, wherein the capacitive segments 111, 121 are formed by p-i-n diode sections of the optical waveguides 11, 12. An active layer (for example, a multi quantum well layer) forms the intrinsic region, a p-doped region above the intrinsic region the p-region and an n-doped layer below the active layer and arranged on a semi-isolating substrate (e.g. an InP-substrate) the n-region of the diodes.

The capacitive segments 111, 121 are coupled in series (indicated by the resistor symbol in the lower left sectional view of FIG. 1) via an n-doped region 3 (conductive region) formed by a portion of the n-doped layer such that the first and the second waveguide electrodes 21, 22 are capacitively coupled to one another, the modulator 1 thus having a capacitively coupled coplanar travelling wave electrode design. Due to the capacitively coupled waveguide electrodes 21, 22 a first voltage +V/2 drops across the first capacitive segments 111 and an opposite voltage −V/2 drops across the second capacitive segments 121 ("push-pull-drive").

The n-doped region 3 is at least partially surrounded by an isolation groove 31 extending through the n-doped layer and thus electrically separating the n-doped region 3 from the coplanar lines 23, 24. For example, the n-doped region 3 has an essentially rectangular contour.

In operation, a high frequency (RF) voltage source 4 is coupled to the first and the second coplanar line 23, 24 such that a microwave travels along the coplanar lines 23, 24 and thus via the plurality of first and second waveguide electrodes 21, 22 along the optical waveguides 11, 12. The endings of the coplanar lines 23, 24 are terminated with a resistor 5.

Figure 2:
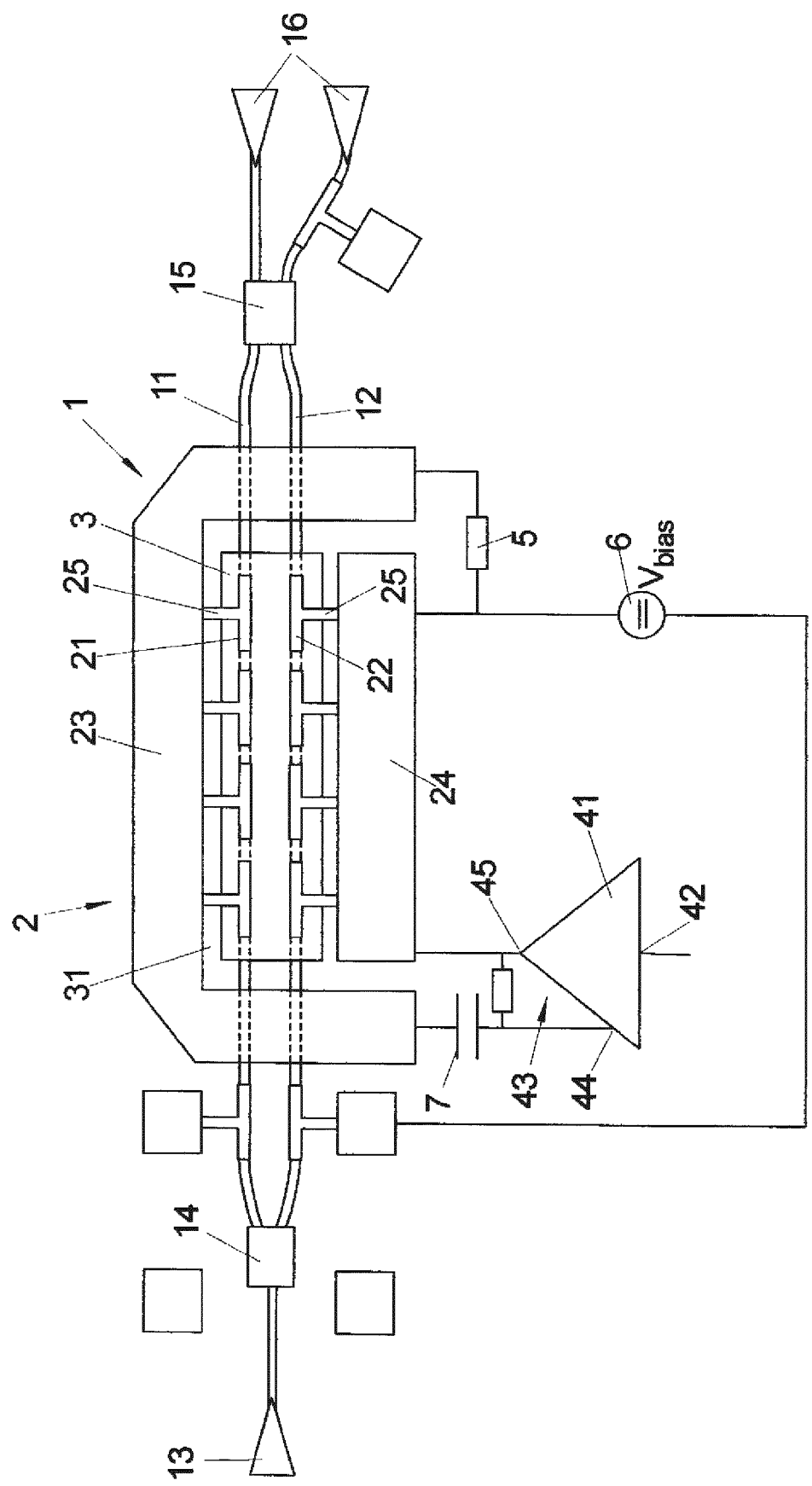
FIG. 2 illustrates the principal layout of a known Mach-Zehnder modulator-driver arrangement.
Figure 3:
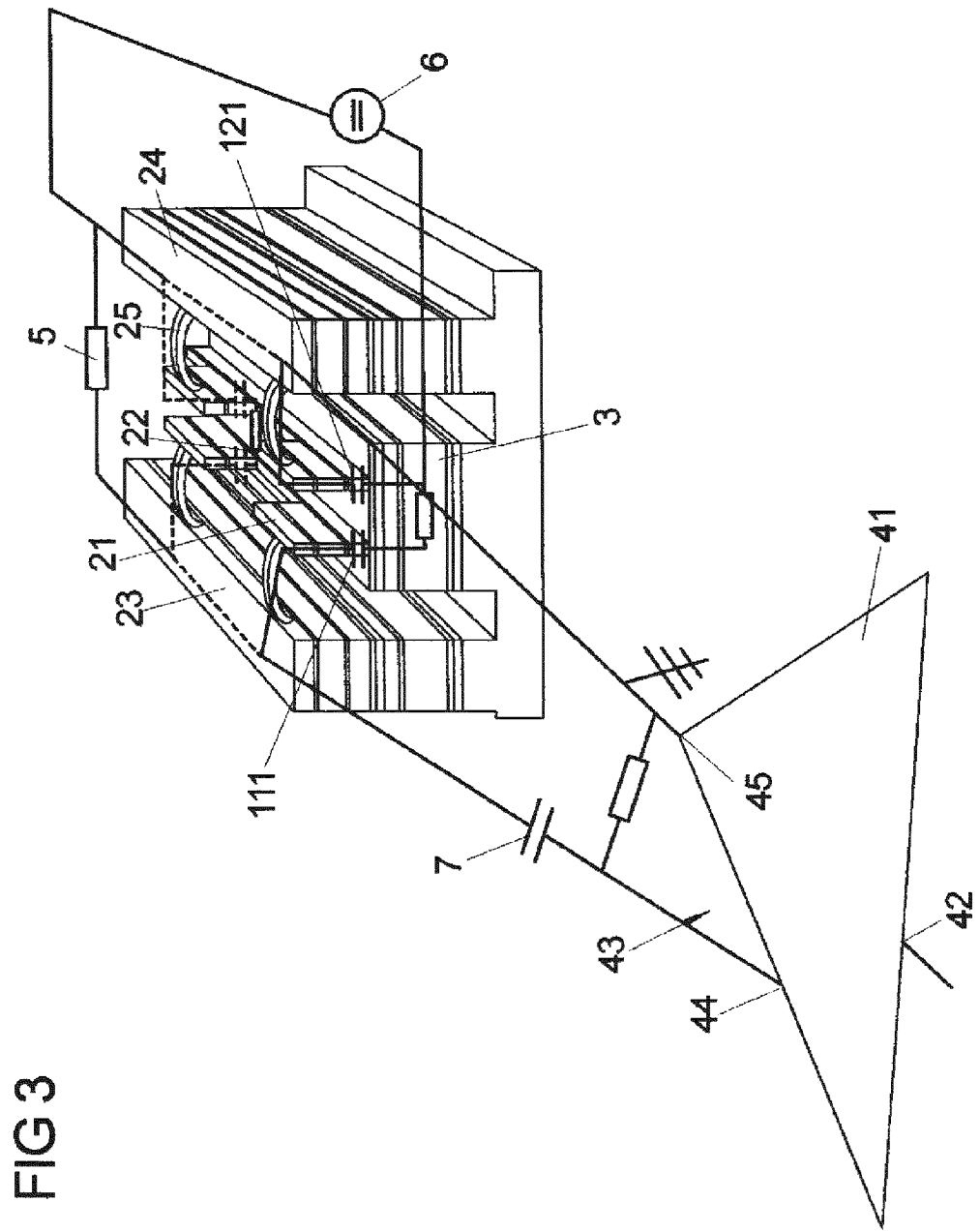
FIG. 3 depicts a perspective view of a known Mach-Zehnder modulator arrangement.

As shown in FIGS. 2 and 3, the high frequency voltage source 4 may comprise a driver unit 41 for amplifying a high frequency input signal supplied to the driver unit 41 via an input port 42. The conventional driver unit 41 shown in FIG.

2 comprises a single output port 43 having a first, non-grounded signal carrying connector 44 and a grounded second connector 45. The signal carrying connector 44 is connected to the first coplanar microwave line 23 and thus to the first waveguide electrode 21, whereas the grounded second connector 45 is connected to the second coplanar line 24 and thus to the second waveguide electrodes 22. The output port 43 of the driver unit 41 has an impedance that is matched to the impedance of the travelling wave electrode arrangement 2. Conventionally, the impedance of the output port 43 is 50 Ohm, i.e. the driver unit 41 and the modulator 1 are 50 Ohm devices, wherein the impedance of the modulator's travelling wave electrode arrangement 2 is designed to be 50 Ohm, the terminating resistor 5 has 50 Ohm as well as the input port 42 of the driver unit 41. Due to the grounding of the second coplanar line 24, the n-doped region 3 has a "floating" potential, i.e. its potential varies dependent on the voltage V applied to the first and the second waveguide electrodes 21, 22 such that the n-doped region 3 may create a stray capacitance against mass.

In order to be able to bias the capacitive segments (the p-i-n diodes) 111, 121 in reverse direction, a DC voltage can be applied between the n-doped region 3 and the second (grounded) coplanar microwave line 24 using a DC source 6. In order to prevent the DC voltage from entering the driver unit 41 via the output port 44 a capacitor 7 or a bias-T (not shown) is introduced between the connector 44 and the first coplanar microwave line 23.

Figure 4:
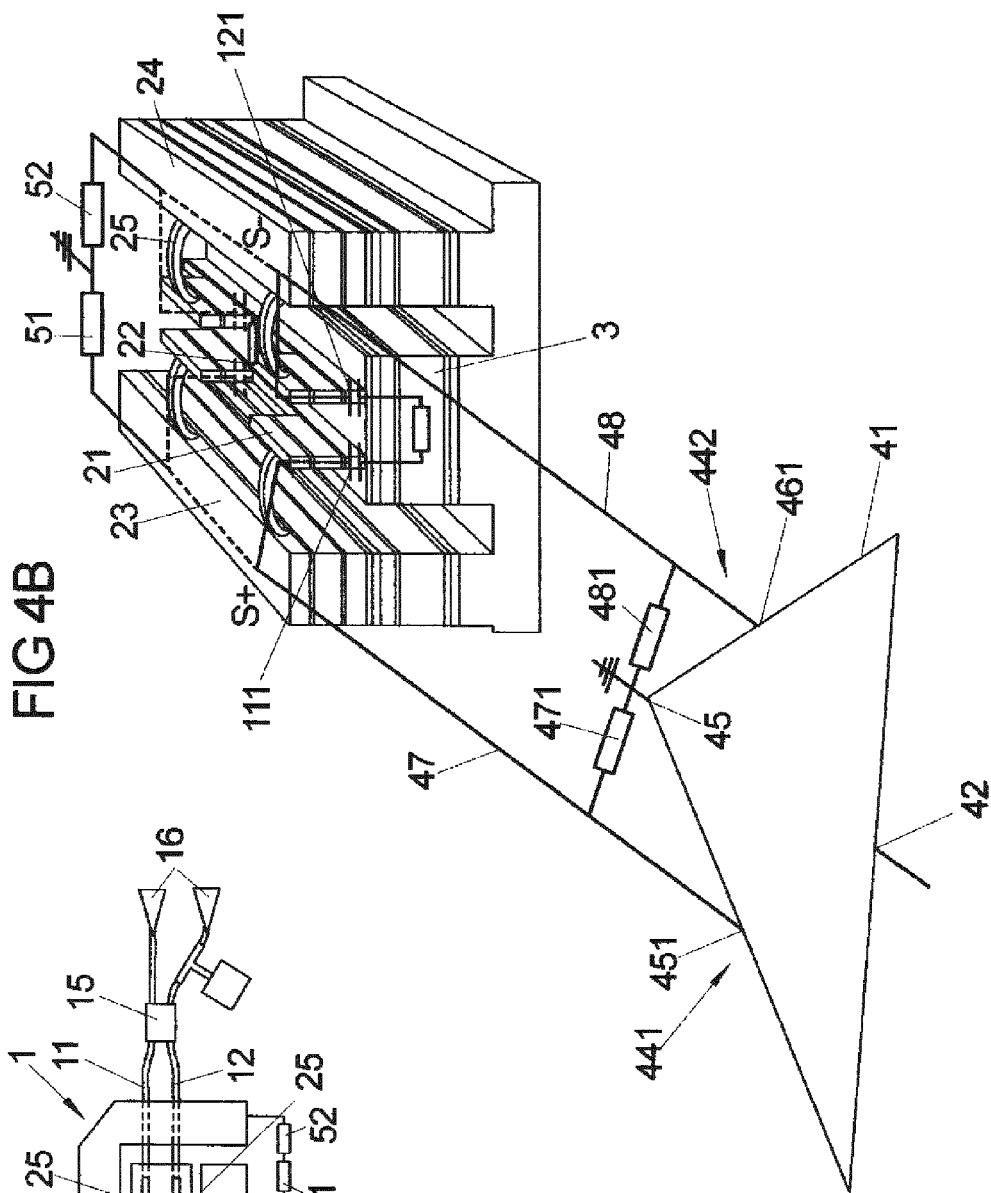
FIG. 4A schematically shows a top view of a Mach-Zehnder modulator arrangement according to an embodiment of the invention.
FIG. 4B shows a perspective view of the Mach-Zehnder modulator arrangement of FIG. 4A.

FIGS. 4A, 4B depict a Mach-Zehnder modulator arrangement according to an embodiment of the invention. The principle layout of the Mach-Zehnder modulator 1 is identical to the layout of the modulator shown in FIGS. 1 to 3. However, the driver unit 41 comprises a first and a second output port 441, 442 coupled to the first coplanar line and the second coplanar line 23, 24, respectively.

The impedance of the driver unit 41 at the first and the second output port 441, 442 is only half of the impedance of the travelling wave electrode arrangement 2. For example, if the impedance of the travelling wave electrode arrangement 2 is about 50 Ohm, the impedance at the first output port 441 is about 25 Ohm and the impedance at the second output port 442 is also about 25 Ohm. The first and the second output ports 441, 442 each comprise a first and second signal-carrying connector 451, 461, wherein the first connector 451 is coupled to the first coplanar line 23 (for example, via a high frequency connecting waveguide in the form of microstrip line 47) and the second connector 461 is coupled to the second coplanar line 24 (for example, also via a high frequency connecting waveguide in the form of a microstrip line 48) such that none of the two coplanar lines 23, 24 is permanently grounded.

For example, the driver unit 41 is a differential driver for symmetrically driving the modulator such that a first signal (potential) in the form of a first voltage signal S+ is supplied to the first microwave line 23 via the first connector 451 and a second, inverse signal (potential) in the form of a second voltage signal S− is supplied to the second coplanar line 24 via the second connector 461. Thus, a first voltage V+ (corresponding to the voltage signal S+) drops at the first capacitive segments 111 and an opposite voltage (i.e. an opposite electrical field) V− drops at the second capacitive segments 121.

The impedance of the microstrip lines 47, 48 is chosen in each case to match the impedance of the output ports 441, 442 of the driver unit 41, i.e. to be at least essentially 25 Ohm (illustrated in FIG. 4B by resistor symbols 471, 481). It is noted that in pure symmetric differential drive operation the absolute value of the first voltage signal S+ is at least essentially identical to the absolute value of the second voltage signal S− (wherein the signals have opposite signs). However, it is also conceivable that the electrode arrangement 2 is not operated in a pure symmetric way such that the first and the second voltage signal have opposite signs but different absolute values or that the signal (potential) of the first and second waveguide electrodes is switched according to the electrode operation of the LVDS approach described above. For example, applying a first and a second voltage signal S+, S− that have different (non-zero) absolute values it may be possible to selectively control a chirp of the optical output of the modulator.

Figure 5:
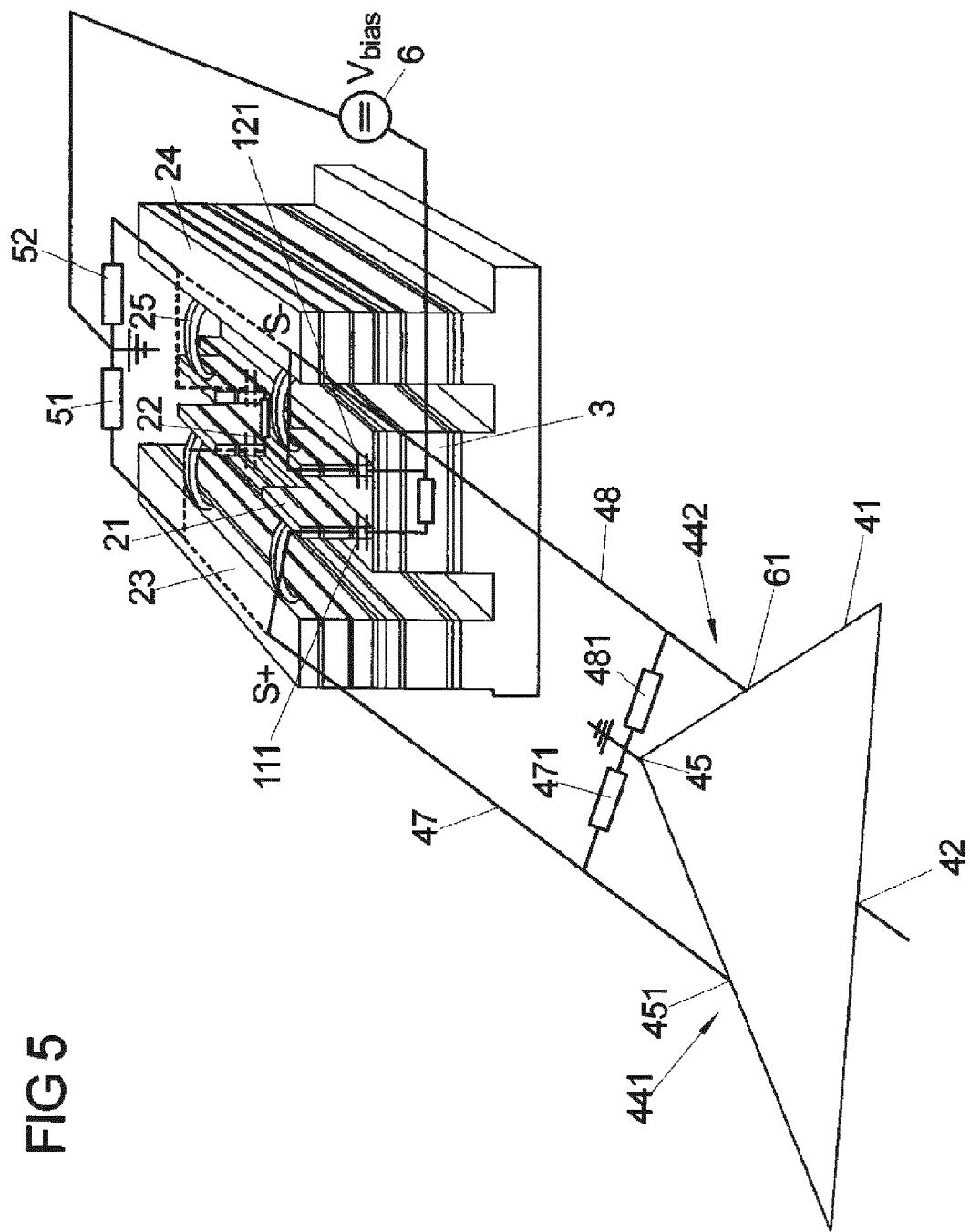
FIG. 5 shows a perspective view of a variant of the Mach-Zehnder modulator arrangement illustrated in FIGS. 4A and 4B.

Further, as shown in FIG. 5, a DC bias source 6 may be provided in order to supply a DC bias voltage $V_{bias}$ across the capacitive segments 111, 121, wherein the DC source 6 is connected to the n-doped region 3 and the microwave lines 23, 24 (via a connecting point between two terminating resistors 51, 52). The terminating resistors 51, 52 each have a resistance corresponding to half the impedance of the travelling wave arrangement, e.g. 25 Ohm each. In contrast to the conventional modulator arrangement, a DC blocking capacitor (such as capacitor 7 in FIG. 2) or a bias-T is not necessary as the capacitive segments 111, 121 inherently decouple the DC voltage supplied by DC source 6 from the driver unit 41 and the terminating resistors 51, 52. Further, although the n-doped region 3 is not connected to a mass connector 45 of the driving unit 41, the n-doped region 3 does not have a floating potential anymore due to the symmetric electrode operation. Rather, its potential may not vary during RF operation of the electrodes such that stray capacitances between the n-doped region 3 and mass may be eliminated or reduced.

Further, as the DC voltage source is connected to a connecting point between the two terminating resistors 51, 52 (having the same resistance value) the DC voltage is symmetrically supplied to the capacitive segments. This has the effect that a photo current created in the region of the capacitive segments will symmetrically flow across both resistors 51, 52 such that the DC voltage across the resistors 51, 52 will be the same, thereby eliminating a contribution of a chirp of the optical signal generated by the Mach-Zehnder modulator.

Figure 6:
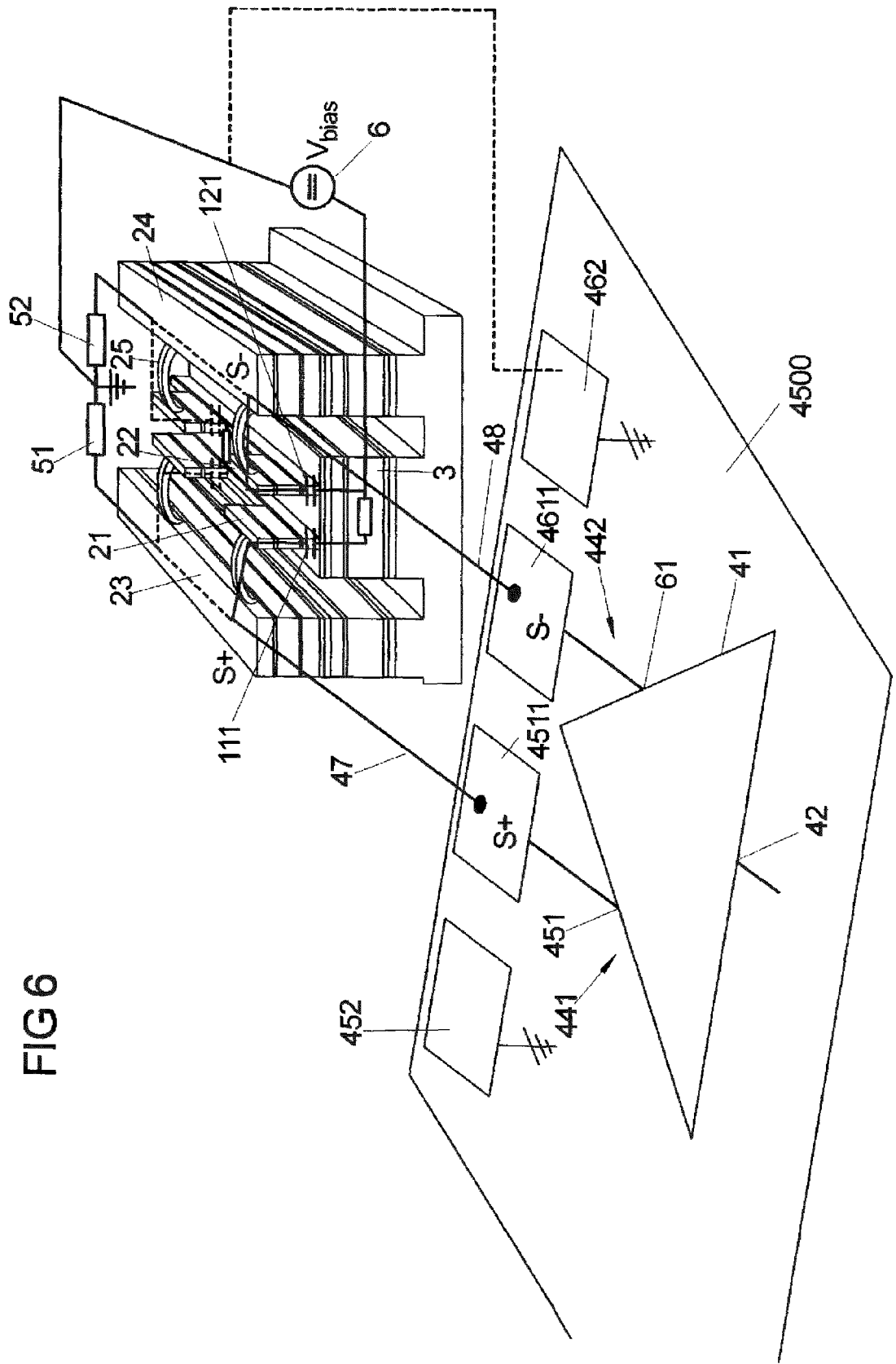
FIG. 6 shows another variant of the Mach-Zehnder modulator arrangement illustrated in FIGS. 4A and 4B.

FIG. 6 shows an example of a configuration of the driver unit 41 used in the modulator arrangement according to the invention. The first and the second output ports 45, 46 have a "ground-signal-signal-ground" configuration, wherein the signal carrying connectors 451, 461 of the first and the second output port 441, 442, respectively, are connected to the coplanar lines 23, 24 as shown in FIGS. 4A, 4B and FIG. 5. Also, the mass side of the DC source 6 may be connected to the mass of the driver unit 41 (as indicated by the dashed line in FIG. 6).

Further ground connectors 452, 462 connected to the ground may be provided, wherein the ground connectors 452, 462 may be realized as actual connectors such as contact pads. However, it is also possible that the ground connectors 452, 462 of the first and the second output port 441, 442 are provided by a general mass (common ground) of the driver unit 41 and/or the Mach-Zehnder modulator, for example, by a grounded substrate 4500 of the driver unit 41. Further, the first and second connector 451, 461 may comprise contact pads 4511, 4611 arranged on the substrate 4500, wherein the microstrip lines 47, 48 may be bonded to the contact pads 4511, 4611.

Figure 7:
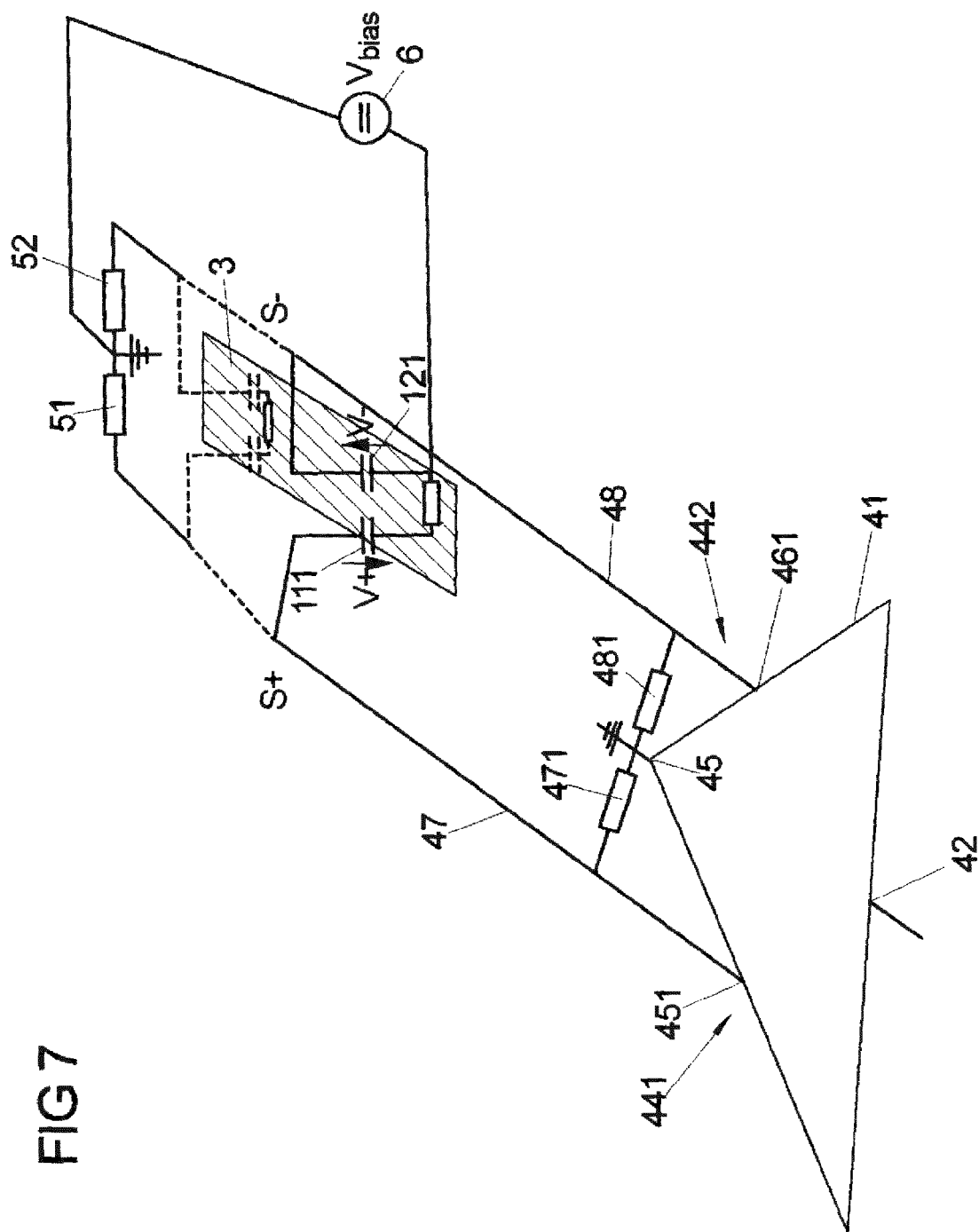
FIG. 7 shows the principle electrical layout of the Mach-Zehnder modulator arrangement of FIG. 6.

As further shown in FIG. 7, the n-doped region 3 (i.e. the conductive region) is electrically isolated from its surroundings (by the isolation groove 31 shown, for example, in FIG. 1) to form a rectangularly shaped structure that capacitively connects the coplanar lines 23, 24 (supplied with signal voltages S+, S−) to one another such that the capacitive segments 111, 121 block the DC bias $V_{bias}$.

Figure 8:
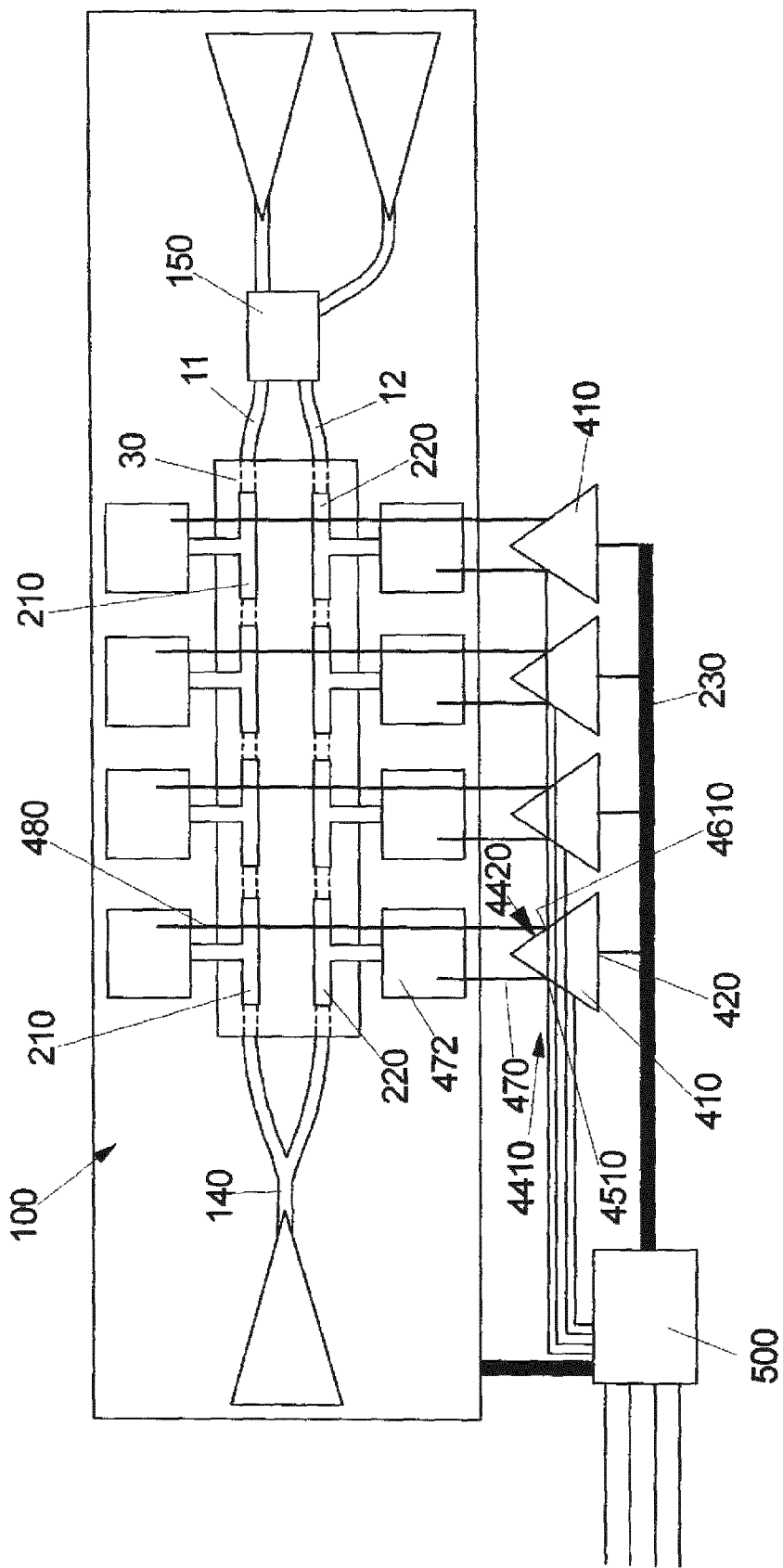
FIG. 8 schematically depicts the principle design of a segmented electrode Mach-Zehnder modulator arrangement.

FIG. 8 shows the principle design of another type of a Mach-Zehnder modulator, namely a segmented electrode (multi electrode) Mach-Zehnder modulator 100. This modulator comprises a plurality of separate (electrically isolated from one another) first and second waveguide electrodes 210, 220 arranged on top of capacitive segments (not shown) of the optical waveguides 11, 12. A plurality of (e.g. amplifying) driver units 410 is arranged along the optical waveguides 11, 12 in such a way that an individual driver unit is assigned to a pair consisting of one of the first waveguide electrodes 210 and one of the second waveguide electrodes 220.

Each one of the driver units 410 comprises a first and a second output port 4410, 4420, wherein a signal-carrying connector 4510 of the first output port 4410 is connected to the assigned first waveguide electrode 210 and a signal-carrying connector 4610 of the second output port 4420 is connected to the assigned second waveguide electrode 220. The connection between the first and second output ports 4410, 4420 of the driver units 410 and the first and second waveguide electrode 210, 220 is established using first and second bonding wire (or flip chip) 470, 480.

Input ports 420 of the driver units 410 are connected to a microwave line 230 running parallel to the optical waveguides 11, 12. The microwave line 230 connect the driver units 410 to a logic circuit 500 receiving high frequency data input ("RF input 1" to "RF input N") from a plurality of sources. The layout of the segmented electrode modulator arrangement is described, for example, in the publication "10 Gb/s-80-km operation of full C-band InP MZ modulator with linear-accelerator-type tiny in-line centipede electrode structure directly driven by logic IC of 90-nm CMOS process", T. Kato et al., Optical Fiber Communication Conference and Exposition, 2011, p. 1, already mentioned above.

In particular, the driver units 410 each are differential drivers such a first potential (S+ in FIG. 9) is supplied to the first waveguide electrodes 210 and a second, inverse potential (S− in FIG. 9) is supplied to the second waveguide electrodes 220.

Instead of using a plurality of driver units it is also conceivable to employ a first digital-to-digital converter for directly and digitally driving the first waveguide electrodes 210 and a second digital-to-digital converter for driving the second waveguide electrodes 220 as described in the publication "Direct Digital Drive Optical QAM Modulator with a Single Multi-Electrode Mach Zehnder Modulator", Y. Ehrlichmann et al., Optical Communication (ECOC), 2010, p. 1, also already mentioned above.

Figure 9:
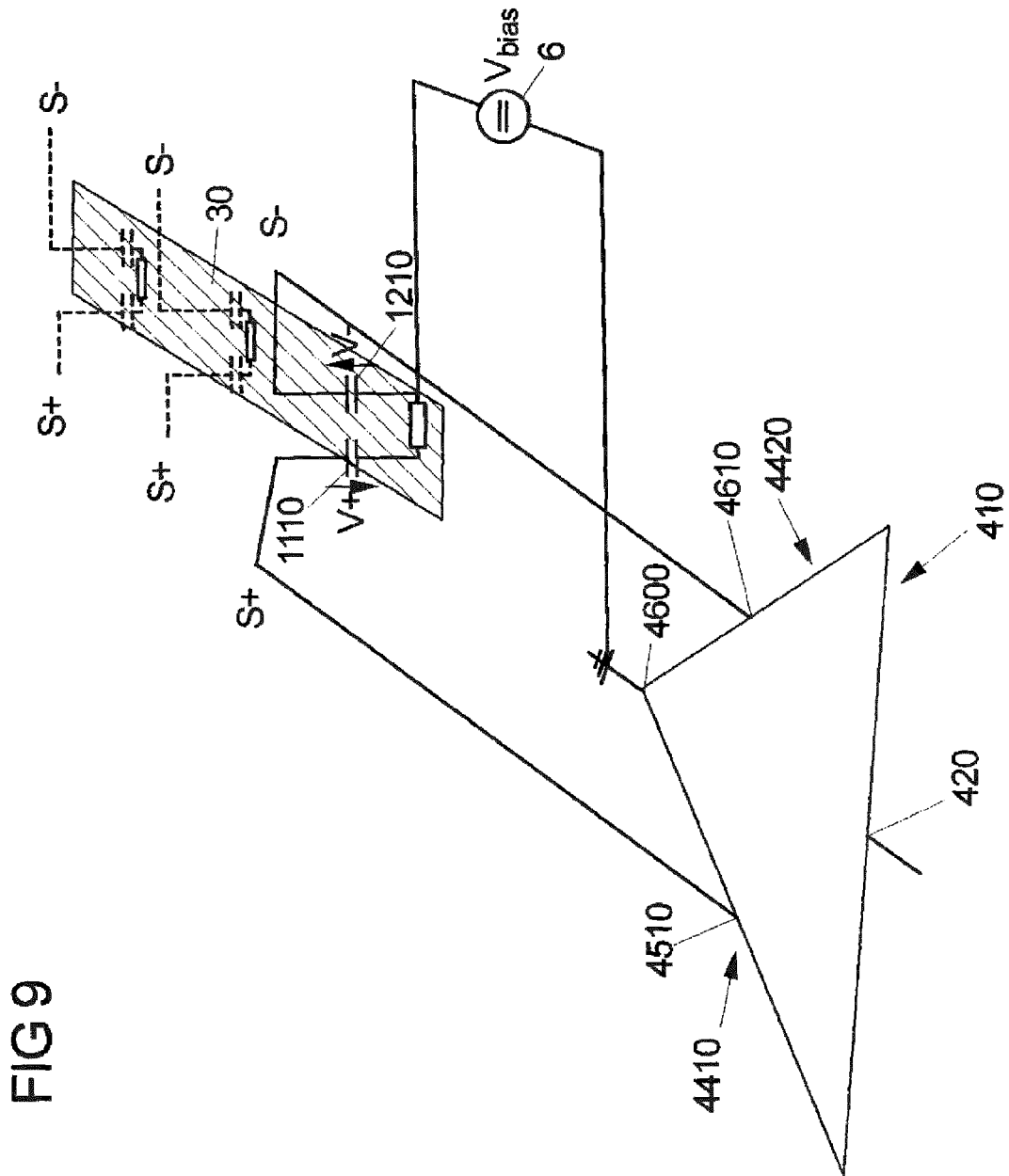
FIG. 9 schematically shows the principle electrical layout of a Mach-Zehnder modulator arrangement according to another embodiment of the invention.
Figure 10:
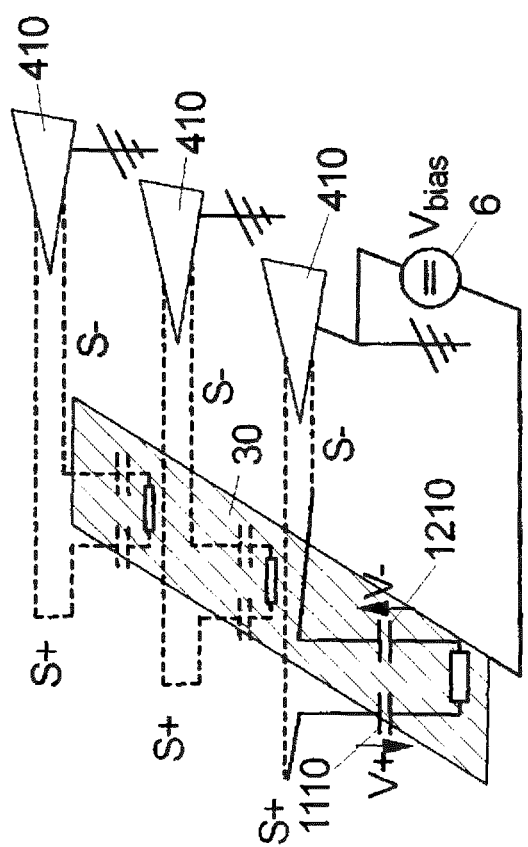
FIG. 10 shows a sectional view of the layout depicted in FIG. 9 upon supplying a DC bias.

FIG. 9 schematically illustrates a modulator arrangement based on the segmented electrode design according to an embodiment of the invention. As mentioned above, a first signal voltage S+ is supplied to each one of the first waveguide electrodes 210 and a second signal voltage S− is supplied to each one of the second waveguide electrodes 220 by means of the multiple driver units 410 (not shown in FIG. 9).

The capacitive segments 1110, 1210 of the optical waveguides 11, 12 are connected via an isolated conductive region in the form of an n-doped region 30 similar to the capacitive segments 111, 121 of the CPS Mach-Zehnder modulator discussed above. Thus, the first and the second waveguide electrodes 210, 220 are capacitively coupled via the capacitive segments 1110, 1210 and the n-doped region 30.

The n-doped region 30 is isolated from its surrounding and thus only extends in the region of the optical waveguides 11, 12. The output ports of the driving units 410 may be connected via contact pads 472 (FIG. 8) to the waveguide electrodes 210, 220, wherein the n-doped region 30 in a direction perpendicular to the optical waveguides extends between two rows of contact pads 472 arranged on the outside of the first and the second optical waveguide 11, 12, respectively. In the direction along the optical waveguides 11, 12 the n-doped region 30 extends between an input splitter 140 and an output combiner 150 such that all of the first capacitive segments 1110 are connected to one of the second capacitive segments 1210 via the n-doped region 30. Further, the n-doped region 30 may be disposed on a different substrate (e.g. an InP-substrate) than the driver units 410 (which may be disposed on a silicon substrate).

Further, the driver units 410 may have an impedance at their output ports 4410, 4420 that in each case is half the impedance of the assigned electrode arrangement comprising the first and the second waveguide electrode coupled to the driving unit and the bonding wires 470, 480 (similar to the configuration of the drive unit 41 discussed above in connection with FIGS. 4A and 4B). For example, the impedance at each one of the output ports 4410, 4420 is about 25 Ohm.

Using short bonding wires 470, 480 (for assembling the modulator and the driver units together) pure capacitive driver units may be used, wherein suited values of the inner resistance of the driver units and of the capacitance of the capacitive segments 1110, 1210 will be chosen to adapt the RC constant of the system.

The capacitive segments 1110, 1210 are biased in reverse direction using a DC source 6 connected to the n-doped region 30 and ground (for example, by connecting the DC source 6 to a ground connector 4600 of one of the driver units 410), wherein it is not required to use a DC blocking capacitor or a bias-T between the waveguide electrodes 210, 220 and the driving units 410 as the biased capacitive diode segments 1110, 1210 already block the DC voltage before arriving at the driving units 410 as already explained in detail above.

REFERENCE SIGNS 1, 100 Mach-Zehnder modulator
2 Travelling wave electrode arrangement
3, 30 n-doped region
4 high frequency source
5 terminating resistor
6 DC source
7 capacitor
11 first optical waveguide
12 second optical waveguide
13, 16 spot size converter
14, 140 splitter
15, 150 combiner
21, 210 first waveguide electrodes
22, 220 second waveguide electrodes
23 first coplanar line
24 second coplanar line
25 air bridge
31 isolation groove
41, 410 driver unit
42 input port
43 output port
44 signal carrying connector
45, 4600 grounded connector
47, 48 microstrip line
51 terminating resistor 111, 1110 first capacitive segments
121, 1210 second capacitive segments
230 microwave line
441, 4410 first output port
442, 4420 second output port
451, 4510 first signal-carrying connector
452, 462, 4511, 4611 contact pad
461, 4610 second signal-carrying connector
470, 480 bonding wire
471, 481 impedance
472 contact pad
500 logic circuit
4500 substrate

The invention claimed is:

1. An electro-optic Mach-Zehnder modulator arrangement, comprising
 a first optical waveguide forming a first arm of the Mach-Zehnder modulator;
 a second optical waveguide forming a second arm of the Mach-Zehnder modulator;
 an electrode arrangement comprising at least one first waveguide electrode and at least one second waveguide electrode arranged on top of a capacitive segment of the first and the second optical waveguide, respectively, such that a voltage can be applied across the capacitive segments of the first and second optical waveguide;
 at least one driver unit for supplying a voltage to the electrode arrangement, the driver unit comprising at least a first output port coupled to the first waveguide electrodes and a second output port coupled to the second waveguide electrodes, wherein
 the driver unit is configured to supply a first varying signal to the first waveguide electrodes via the first output port and to supply a second varying signal to the second waveguide electrodes via the second output port; and
 a non-grounded conductive region via which the capacitive segment of the first optical waveguide is connected to the capacitive segment of the second optical waveguide such that the first and second waveguide electrodes are capacitively coupled to one another;
 a DC-source connected to the first and/or the second waveguide electrode and the non-grounded conductive region for supplying a bias voltage across the capacitive segments of the optical waveguides,
 wherein the DC-source is connected to the first and the second waveguide electrode via a connecting point located between two terminating resistors coupled between the first and the second waveguide electrode such that the DC voltage is symmetrically supplied to the capacitive segments, or
 the electrode arrangement comprises a plurality of first waveguide electrodes and a plurality of second waveguide electrodes and a plurality of driver units, wherein each one of the driver units is assigned to one first waveguide electrode and one second waveguide electrode, wherein the DC-source is connected to the non-grounded conductive region and ground.

2. The Mach-Zehnder modulator arrangement as claimed in claim 1, wherein the non-grounded conductive region is arranged on a side of the capacitive segments that faces away from the waveguide electrodes.

3. The Mach-Zehnder modulator arrangement as claimed in claim 1, wherein the Mach-Zehnder modulator is formed as a semi-conductor device, and wherein the conductive region is formed by an n-doped semiconductor layer.

4. The Mach-Zehnder modulator arrangement as claimed in claim 3, wherein the non-grounded conductive region is formed by a portion of the n-doped semiconductor layer that is at least partially surrounded by an isolation groove extending through the n-doped semiconductor layer.

5. The Mach-Zehnder modulator arrangement as claimed in claim 1, further comprising a DC-source connected to the mass of the driving unit and the non-grounded conductive region for supplying a bias voltage across the capacitive segments of the optical waveguides.

6. The Mach-Zehnder modulator arrangement as claimed in claim 1, wherein the first and the second output port of the driver unit are connected to the first and the second waveguide electrode directly without a blocking capacitor arranged between the output ports and the driver unit.

7. The Mach-Zehnder modulator arrangement as claimed in claim 1, wherein the driver unit is a differential driver unit configured in such a way that the first and the second signal supplied to the first and second waveguide electrodes, respectively, have opposite polarity.

8. The Mach-Zehnder modulator arrangement as claimed in claim 1, wherein both the first waveguide electrodes are electrically isolated from one another and the second waveguide electrodes are electrically isolated from one another.

9. The Mach-Zehnder modulator arrangement as claimed in claim 1, further comprising at least one digital-to-digital converter, at least one digital-to-analog converter and/or at least one field programmable gate array component connected to at least one of the driver units or implementing at least one of the driver units.

10. The Mach-Zehnder modulator arrangement as claimed in claim 1, further comprising a first and a second electrical line extending essentially parallel to the first and second optical waveguide, wherein the signal-carrying connector of the first output port and the signal-carrying connector of the second output port of the driver unit are coupled to the plurality of first and second waveguide electrodes via the first and second electrical line, respectively.

11. Method for operating a Mach-Zehnder modulator arrangement, comprising the steps of:
 providing at least one electro-optic Mach-Zehnder modulator comprising a first optical waveguide forming a first modulator arm and a second optical waveguide forming a second modulator arm;
 providing an electrode arrangement comprising at least one first waveguide electrode and at least one second waveguide electrode arranged on top of a capacitive segment of the first and the second optical waveguide, respectively, such that a voltage can be applied across the capacitive segments of the first and second optical waveguide;
 providing a non-grounded conductive region via which the capacitive segment of the first waveguide electrode is connected to the capacitive segment of the second waveguide electrode such that the first and second waveguide electrodes are capacitively coupled to one another; and
 supplying a first varying signal to the first waveguide electrodes and supplying a second varying signal to the second waveguide electrodes;
 providing a DC-source connected to the first and/or the second waveguide electrode and the non-grounded conductive region for supplying a bias voltage across the capacitive segments of the optical waveguides, and
 connecting the DC-source to the first and the second waveguide electrode via a connecting point located between two terminating resistors coupled between the first and the second waveguide electrode such that the DC voltage is symmetrically supplied to the capacitive segments, or providing a plurality of first waveguide electrodes and a plurality of second waveguide electrodes and a plurality of driver units, wherein each one of the driver units is assigned to one first waveguide electrode and one second waveguide electrode, and connecting the DC source to the non-grounded conductive region and ground.

* * * * *

UNITED STATES PATENT AND TRADEMARK OFFICE
CERTIFICATE OF CORRECTION

PATENT NO.            : 9,140,957 B2                                   Page 1 of 1
APPLICATION NO.       : 14/371978
DATED                 : September 22, 2015
INVENTOR(S)           : Velthaus It is certified that error appears in the above-identified patent and that said Letters Patent is hereby corrected as shown below:

In Column 1, Line 59, delete "comprising" and insert -- comprising: --, therefor.

In Column 3, Line 31, delete "still be be" and insert -- still be --, therefor.

In Column 3, Line 47, delete "electrodes (s))." and insert -- electrodes (s). --, therefor.

In Column 13, Line 16, in Claim 1, delete "comprising" and insert -- comprising: --, therefor.

In Column 14, Line 39, in Claim 11, delete "Method" and insert -- A method --, therefor.

Signed and Sealed this
Fourteenth Day of June, 2016

Michelle K. Lee
*Director of the United States Patent and Trademark Office*